US012759587B2

(12) United States Patent
Shirakata et al.

(10) Patent No.: US 12,759,587 B2
(45) Date of Patent: Oct. 13, 2026

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Kento Shirakata, Wako (JP); Takashi Matsumoto, Wako (JP); Hideki Matsunaga, Wako (JP); Ryoji Wakayama, Wako (JP); Koki Aizawa, Wako (JP); Yunosuke Kuramitsu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 26 days.

(21) Appl. No.: 18/850,587

(22) PCT Filed: Mar. 29, 2022

(86) PCT No.: PCT/JP2022/015474

§ 371 (c)(1),
(2) Date: Sep. 25, 2024

(87) PCT Pub. No.: WO2023/187995

PCT Pub. Date: Oct. 5, 2023

(65) Prior Publication Data

US 2025/0214627 A1 Jul. 3, 2025

(51) Int. Cl.
*G06V 20/56* (2022.01)
*B60W 30/14* (2006.01)
(Continued)

(52) U.S. Cl.
CPC ...... *B60W 60/0025* (2020.02); *B60W 30/146* (2013.01); *G06V 10/751* (2022.01);
(Continued)

(58) Field of Classification Search
CPC ........... B60W 2540/30; B60W 30/162; B60W 30/146; B60W 60/001; B60W 60/0025;
(Continued)

(56) References Cited

U.S. PATENT DOCUMENTS 9,046,413 B2 * 6/2015 Nielsen .................. G01C 15/02
11,117,488 B2 * 9/2021 Whitt ...................... B60L 58/13
(Continued)

FOREIGN PATENT DOCUMENTS

CN 112061124 12/2020
EP 2045178 4/2009
(Continued)

OTHER PUBLICATIONS

Japanese Office Action for Japanese Patent Application No. 2024-510797 mailed Jul. 15, 2025.
(Continued)

*Primary Examiner* — Dalena Tran
(74) *Attorney, Agent, or Firm* — Amin, Turocy & Watson, LLP

(57) ABSTRACT

A mobile object control device for controlling a mobile object capable of moving both on a roadway and in a predetermined region different from the roadway includes a road type recognition unit configured to recognize whether the mobile object is moving on the roadway or in the predetermined region on the basis of an output of an external environment detection device configured to detect an external situation of the mobile object and a control unit configured to limit a speed of a case where the mobile object moves on the roadway to a first speed and limit a speed of a case where the mobile object moves in the predetermined region to a second speed lower than the first speed. The road type recognition unit iteratively recognizes whether the mobile object is moving on the roadway or in the predeter-
(Continued)

mined region on the basis of recognition results of a previous first period and the output of the external environment detection device and causes a storage device to store a recognition result. The road type recognition unit outputs a recognition result indicating that the mobile object is moving on a sidewalk during a second period to the control unit when at least some of the recognition results of the previous first period in the storage device are lost.

9 Claims, 7 Drawing Sheets

(51) Int. Cl.
*B60W 60/00* (2020.01)
*G06V 10/75* (2022.01)

(52) U.S. Cl.
CPC ....... *G06V 20/588* (2022.01); *B60W 2300/34* (2013.01); *B60W 2420/403* (2013.01); *B60W 2552/05* (2020.02); *B60W 2552/53* (2020.02); *B60W 2556/10* (2020.02)

(58) Field of Classification Search
CPC ............. B60W 2552/05; G08G 1/0112; G08G 1/0145; G08G 1/04; G06V 20/58; G06V 20/588
See application file for complete search history.

(56) References Cited

U.S. PATENT DOCUMENTS

| | | | |
|---|---|---|---|
| 2014/0136414 A1 | 5/2014 | Abhyanker | |
| 2018/0101179 A1* | 4/2018 | Louey | B60L 50/52 |
| 2019/0049968 A1* | 2/2019 | Dean | G05D 1/0255 |
| 2020/0124430 A1 | 4/2020 | Bradlow et al. | |
| 2020/0143237 A1* | 5/2020 | Gordon | G06N 3/08 |
| 2021/0034156 A1 | 2/2021 | Drayna | |

FOREIGN PATENT DOCUMENTS

| | | |
|---|---|---|
| JP | 2009-089758 | 4/2009 |
| JP | 2017-100490 | 6/2017 |
| JP | 2019-197328 | 11/2019 |
| JP | 2020-189537 | 11/2020 |
| JP | 2020-197387 | 12/2020 |
| WO | 2020/082089 | 4/2020 |

OTHER PUBLICATIONS

International Search Report and Written Opinion for International Application No. PCT/JP2022/015474 mailed on Jun. 21, 2022, 8 pages.
Extended European Search Report for European Patent Application No. 22935145.7 mailed Feb. 17, 2026.
Extended European Search Report for European Patent Application No. 22935145.7 mailed May 22, 2026.

* cited by examiner

| CONTROL TIME | k-1 | k-2 | … | k-n |
|---|---|---|---|---|
| ABSOLUTE TIME | 20220308, 13131005 | 20220308, 13130955 | … | 20220308, 13125805 |
| RECOGNITION RESULT | 1 | 1 | … | 0 |

MOBILE OBJECT CONTROL DEVICE, MOBILE OBJECT CONTROL METHOD, AND STORAGE MEDIUM

TECHNICAL FIELD

The present invention relates to a mobile object control device, a mobile object control method, and a storage medium.

BACKGROUND ART

Conventionally, practical applications have been made for mobile objects capable of moving on both a sidewalk and a roadway and it is necessary to set different upper limit speeds for the sidewalk and the roadway for such mobile objects. In this regard, the invention of a device including left and right imaging units configured to capture a road surface, a block detection unit configured to detect a direction in which an electric vehicle can move from the image data of the left and right imaging units, a distance calculation unit configured to generate instruction information for controlling movement of the electric vehicle on the basis of the direction detected by the block detection unit, and a vehicle control unit configured to control the movement of the electric vehicle on the basis of the instruction information generated by the distance calculation unit has been disclosed (Patent Document 1).

CITATION LIST

Patent Document

Patent Document 1

Japanese Unexamined Patent Application, First Publication No. 2019-197328

SUMMARY OF INVENTION

Technical Problem

In the conventional technology, it may not be possible to appropriately recognize whether a mobile object is moving on a roadway or in a predetermined region different from the roadway in consideration of robust stability.

The present invention has been made in consideration of such circumstances and an objective of the present invention is to provide a mobile object control device, a mobile object control method, and a storage medium for enabling whether a mobile object is moving on a roadway or in a predetermined region different from the roadway to be appropriately recognized in consideration of robust stability.

Solution to Problem

A mobile object control device, a mobile object control method, and a storage medium according to the present invention adopt the following configurations.

(1): According to an aspect of the present invention, there is provided a mobile object control device for controlling a mobile object capable of moving both on a roadway and in a predetermined region different from the roadway in a state in which one or more occupants are boarding the mobile object, the mobile object control device including: a road type recognition unit configured to recognize whether the mobile object is moving on the roadway or in the predetermined region on the basis of an output of an external environment detection device configured to detect an external situation of the mobile object; and a control unit configured to limit a speed of a case where the mobile object moves on the roadway to a first speed and limit a speed of a case where the mobile object moves in the predetermined region to a second speed lower than the first speed, wherein the road type recognition unit iteratively recognizes whether the mobile object is moving on the roadway or in the predetermined region on the basis of recognition results of a previous first period and the output of the external environment detection device and causes a storage device to store a recognition result, and wherein the road type recognition unit outputs a recognition result indicating that the mobile object is moving on a sidewalk during a second period to the control unit when at least some of the recognition results of the previous first period in the storage device are lost.

(2): In the above-described aspect (1), the road type recognition unit causes the control unit to perform a predetermined operation for causing the external environment detection device to detect a feature of either the roadway or the predetermined region when at least some of the recognition results of the previous first period in the storage device are lost.

(3): In the above-described aspect (2), the external environment detection device is able to change a detection direction, and the predetermined operation is an operation for causing the external environment detection device to search for the feature by changing the detection direction of the external environment detection device.

(4): In the above-described aspect (2), the control unit causes the mobile object to move autonomously by controlling a drive device, and the predetermined operation is an operation for causing the external environment detection device to search for the feature while changing a direction of the mobile object.

(5): In the above-described aspect (2), the control unit causes the mobile object to move autonomously by controlling a drive device, and the predetermined operation is an operation for causing the mobile object to approach the feature and causing the external environment detection device to accurately recognize the feature.

(6): In the above-described aspect (1), when the mobile object control device is activated, the road type recognition unit treats a recognition result before a shutdown as a recognition result of the previous first period if a recognition result before the shutdown and the output of the external environment detection device are stored in the storage device and a current output of the external environment detection device is similar to an output of the external environment detection device before the shutdown.

(7): In the above-described aspect (6), the external environment detection device is an external camera configured to image the outside of the mobile object, and the road type recognition unit performs a process of extracting a feature point of an image captured by the external camera and determines that the current output of the external environment detection device is similar to the output of the external environment detection device before the shutdown when positions of feature points match at a predetermined ratio or higher.

(8): In the above-described aspect (6), the external environment detection device is an external camera configured to image the outside of the mobile object, and the road type recognition unit determines that captured images are similar when a sum of differences between pixel values of pixels of the captured images of the external camera is less than or equal to a predetermined value.

(9): According to another aspect of the present invention, there is provided a mobile object control method including: recognizing, by a computer for controlling a mobile object capable of moving both on a roadway and in a predetermined region different from the roadway in a state in which one or more occupants are boarding the mobile object, whether the mobile object is moving on the roadway or in the predetermined region on the basis of an output of an external environment detection device configured to detect an external situation of the mobile object; and limiting, by the computer, a speed of a case where the mobile object moves on the roadway to a first speed and limiting a speed of a case where the mobile object moves in the predetermined region to a second speed lower than the first speed, wherein the recognizing includes iteratively recognizing whether the mobile object is moving on the roadway or in the predetermined region on the basis of recognition results of a previous first period and the output of the external environment detection device and causing a storage device to store a recognition result, and outputting a recognition result indicating that the mobile object is moving during a second period to the control unit when at least some of the recognition results of the previous first period in the storage device are lost.

(10): According to yet another aspect of the present invention, there is provided a storage medium storing a program for causing a computer for controlling a mobile object capable of moving both on a roadway and in a predetermined region different from the roadway in a state in which one or more occupants are boarding the mobile object to: recognize whether the mobile object is moving on the roadway or in the predetermined region on the basis of an output of an external environment detection device configured to detect an external situation of the mobile object; and limit a speed of a case where the mobile object moves on the roadway to a first speed and limit a speed of a case where the mobile object moves in the predetermined region to a second speed lower than the first speed, wherein the recognizing includes iteratively recognizing whether the mobile object is moving on the roadway or in the predetermined region on the basis of recognition results of a previous first period and the output of the external environment detection device and causing a storage device to store a recognition result, and outputting a recognition result indicating that the mobile object is moving during a second period to the control unit when at least some of the recognition results of the previous first period in the storage device are lost.

Advantageous Effects of Invention

According to the above-described aspects (1) to (10), it is possible to appropriately recognize whether a mobile object is moving on a roadway or in a predetermined region different from the roadway in consideration of robust stability.

DESCRIPTION OF EMBODIMENTS

Hereinafter, embodiments of a mobile object control device, a mobile object control method, and a program according to the present invention will be described with reference to the drawings. A mobile object moves both on a roadway and in a predetermined region different from the roadway. The mobile object may be referred to as micromobility. An electric kickboard is a type of micromobility. The predetermined region is, for example, a sidewalk. Moreover, the predetermined region may be a part or all of a roadside strip, a bicycle lane, a public open space, or the like or may include all sidewalks, roadside strips, bicycle lanes, public open spaces, and the like. In the following description, it is assumed that the predetermined region is a sidewalk. In the following description, a part described as the "sidewalk" can be read as the "predetermined region" as appropriate. Mobile objects are not limited to vehicles and may include a small mobility for moving side by side with a walking user and carrying cargo or guiding a person and may include other mobile objects (for example, a walking robot and the like) that can move autonomously.

Figure 1:
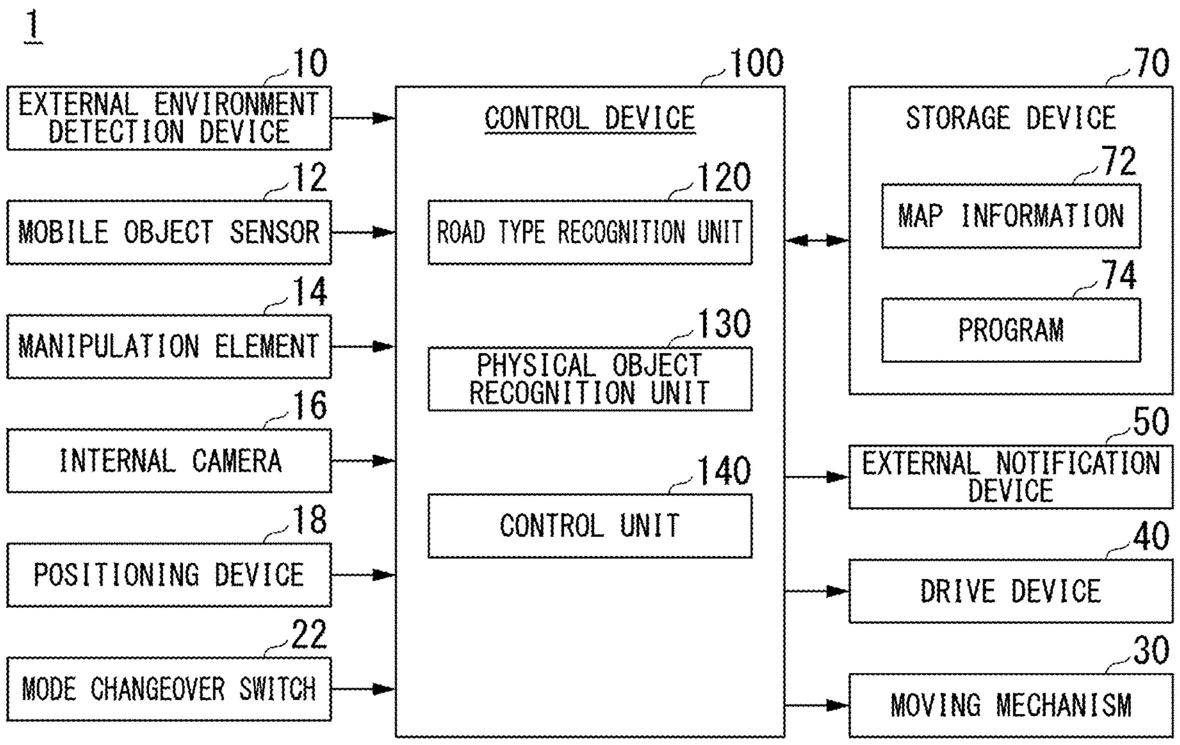
FIG. 1 is a diagram showing an example of a configuration of a mobile object and a control device according to an embodiment.

FIG. 1 is a diagram showing an example of a configuration of the mobile object 1 and the control device 100 according to the embodiment. The mobile object 1 includes, for example, an external environment detection device 10, a mobile object sensor 12, a manipulation element 14, an internal camera 16, a positioning device 18, a mode changeover switch 22, a moving mechanism 30, a drive device 40, an external notification device 50, a storage device 70, and a control device 100. Also, some constituent elements not essential for implementing the functions of the present invention may be omitted.

The external environment detection device 10 includes various types of devices in which a movement direction of the mobile object 1 is designated as a detection range. The external environment detection device 10 includes an external camera, a radar device, a light detection and ranging (LIDAR) sensor, a sensor fusion device, and the like. The external environment detection device 10 outputs information indicating a detection result (an image, a position of a physical object, or the like) to the control device 100. The external environment detection device 10 may include a mechanical or electronic means that can change a detection direction. For example, a mechanism that can mechanically change an optical axis direction and can be manipulated externally may be provided in the external camera.

The mobile object sensor 12 includes, for example, a speed sensor, an acceleration sensor, a yaw rate (angular velocity) sensor, an orientation sensor, a manipulation quantity detection sensor attached to the manipulation element 14, and the like. The manipulation element 14 includes, for example, a manipulation element for issuing an acceleration/deceleration instruction (for example, an accelerator pedal or a brake pedal) and a manipulation element for issuing a steering instruction (for example, a steering wheel). In this case, the mobile object sensor 12 may include an accelerator opening degree sensor, a brake depression amount sensor, a steering torque sensor, and the like. The mobile object 1 may include a type of manipulation element other than the above manipulation elements (for example, a non-annular rotation manipulation element, a joystick, a button, or the like) as the manipulation element 14.

The internal camera 16 images at least a head of the occupant of the mobile object 1 from the front. The internal camera 16 is a digital camera that uses an imaging element such as a charge-coupled device (CCD) or a complementary metal oxide semiconductor (CMOS). The internal camera 16 outputs a captured image to the control device 100.

The positioning device 18 is a device for measuring a position of the mobile object 1. The positioning device 18 is, for example, a global navigation satellite system (GNSS) receiver, and identifies the position of the mobile object 1 on the basis of a signal received from a GNSS satellite and outputs the identified position as position information. Also, the position information of the mobile object 1 may be estimated from a position of a Wi-Fi base station to which a communication device to be described below is connected.

The mode changeover switch 22 is a switch to be manipulated by the occupant. The mode changeover switch 22 may be a mechanical switch or a graphical user interface (GUI) switch set on the touch panel. The mode changeover switch 22 receives a manipulation for switching a driving mode to any one of, for example, mode A that is an assist mode in which one of the steering manipulation and acceleration/deceleration control is performed by the occupant and the other is performed automatically and that may be mode A-1 in which the steering manipulation is performed by the occupant and the acceleration/deceleration control is performed automatically or mode A-2 in which an acceleration/deceleration manipulation is performed by the occupant and the steering control is performed automatically, mode B that is a manual driving mode in which the steering manipulation and the acceleration/deceleration manipulation are performed by the occupant, and mode C that is an automated driving mode in which the steering control and the acceleration/deceleration control are performed automatically.

The moving mechanism 30 is a mechanism for moving the mobile object 1 on the road. The moving mechanism 30 is, for example, a wheel group that includes a steered wheel and a driven wheel. Moreover, the moving mechanism 30 may be a leg unit for multi-legged walking.

The drive device 40 outputs a force to the moving mechanism 30 so that the mobile object 1 can be moved. For example, the drive device 40 includes a motor that drives the driven wheel, a battery that stores electric power to be supplied to the motor, a steering device that adjusts the steering angle of the steered wheel, and the like. The drive device 40 may include an internal combustion engine, a fuel cell, or the like as a driving force output means or an electric power generation means. Moreover, the drive device 40 may further include a braking device using a friction force or air resistance.

The external notification device 50 is, for example, a lamp, a display device, a speaker, or the like provided on an outer plate portion of the mobile object 1 and configured to provide a notification of information to the outside of the mobile object 1. The external notification device 50 performs different operations in a state in which the mobile object 1 is moving on the sidewalk and a state in which the mobile object 1 is moving on the roadway. For example, the external notification device 50 is controlled so that light of the lamp is emitted when the mobile object 1 is moving on the sidewalk and light of the lamp is not emitted when the mobile object 1 is moving on the roadway. The color of the light emitted by this lamp is preferably a color specified by law. The external notification device 50 may be controlled so that the light of the lamp is emitted in green when the mobile object 1 is moving on the sidewalk and the light of the lamp is emitted in blue when the mobile object 1 is moving on the roadway. When the external notification device 50 is a display device, the external notification device 50 displays text or a graphic indicating “moving on the sidewalk” when the mobile object 1 is moving on the sidewalk.

Figure 2:
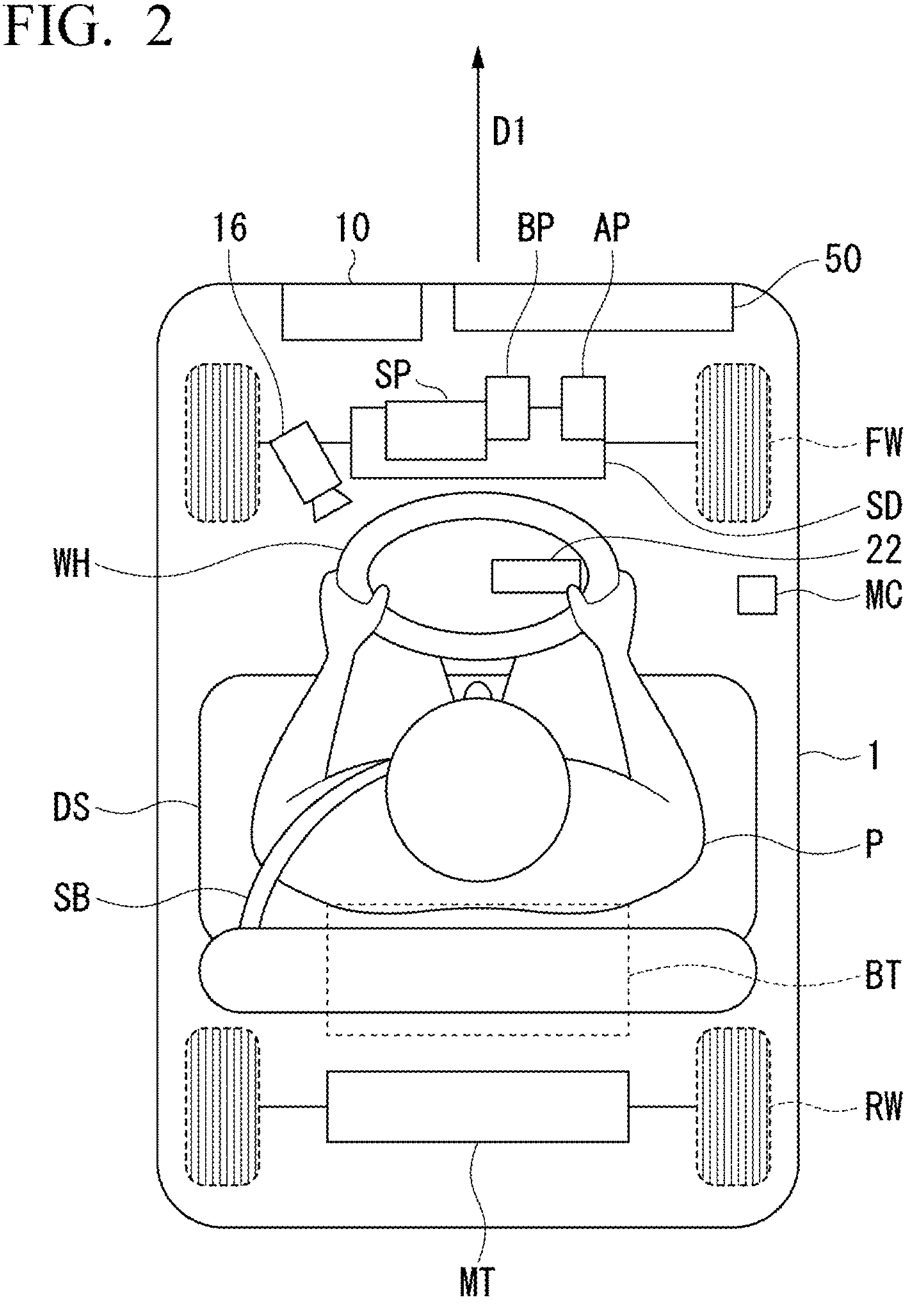
FIG. 2 is a perspective view of the mobile object viewed from above.

FIG. 2 is a perspective view of the mobile object 1 viewed from above. In FIG. 2, FW denotes the steered wheel, RW denotes the driven wheel, SD denotes the steering device, MT denotes the motor, and BT denotes the battery. The steering device SD, the motor MT, and the battery BT are included in the drive device 40. Moreover, AP denotes the accelerator pedal, BP denotes the brake pedal, WH denotes the steering wheel, SP denotes the speaker, and MC denotes a microphone. The mobile object 1 shown in FIG. 2 is a single-seater mobile object and an occupant P is seated in the driver's seat DS and wearing a seat belt SB. An arrow D1 indicates a movement direction (a speed vector) of the mobile object 1. The external environment detection device 10 is provided near a front end of the mobile object 1, the internal camera 16 is provided at a position where the head of the occupant P can be imaged from the front of the occupant P, and the mode changeover switch 22 is provided on a boss portion of the steering wheel WH. Moreover, the external notification device 50 serving as a display device is provided near the front end of the mobile object 1.

Returning to FIG. 1, the storage device 70 is, for example, a non-transitory storage device such as a hard disk drive (HDD), a flash memory, or a random-access memory (RAM). The storage device 70 stores map information 72, a program 74 to be executed by the control device 100, and the like. Although the storage device 70 is shown outside a frame of the control device 100 in FIG. 1, the storage device 70 may be included in the control device 100. Moreover, the storage device 70 may be provided on a server (not shown).

[Control Device]

The control device 100 includes, for example, a road type recognition unit 120, a physical object recognition unit 130, and a control unit 140. These constituent elements are implemented, for example, by a hardware processor such as a central processing unit (CPU) executing a program (software) 74. Also, some or all of these constituent elements may be implemented by hardware (including a circuit unit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in the storage device 70 or may be stored in a removable storage medium (a non-transitory storage medium) such as a DVD or a CD-ROM and installed in the storage device 70 when the storage medium is mounted in a drive device.

The road type recognition unit 120 recognizes whether the mobile object 1 is moving on the roadway or the sidewalk. For example, the road type recognition unit 120 recognizes whether the mobile object 1 is moving on the roadway or the sidewalk by analyzing an image captured by the external camera of the external environment detection device 10. Also, the output of a radar device, a LIDAR sensor, a sensor fusion device, or the like may be used in an auxiliary way.

The road type recognition unit 120 calculates, for example, a roadway score Sc indicating the certainty that the mobile object 1 is moving on the roadway. For example, the road type recognition unit 120 adds a point value to the roadway score Sr every time the road type recognition unit 120 recognizes each of the plurality of first events indicating that the mobile object 1 is moving on the roadway and subtracts a point value from the roadway score Sr every time the road type recognition unit 120 recognizes each of the plurality of second events indicating that the mobile object 1 is moving on the sidewalk. The first events are, for example, event (A) in which there is no static obstacle other than a vehicle (for example, a standing signboard or the like) in a host region (a region where the mobile object 1 is located), event (B) in which the vehicle is moving in the host region, event (C) in which there is a road surface marking on the road surface in the host region, event (D) in which there is a crosswalk in the host region, event (E) in which the host region is located on a lower side with respect to a step, and the like. The second events are, for example, event (a) in which a second surface facing the sidewalk side between two surfaces of a guardrail has been imaged by the external camera, event (b) in which a braille block is located on the road surface of the host region, event (c) in which there is a static obstacle other than the vehicle in the host region, event (d) in which the host region is located on the upper side with respect to the step, and the like.

Further, the road type recognition unit 120 causes the storage device 70 to store recognition results of a previous first period and recognizes whether the mobile object 1 is moving on the roadway or the sidewalk on the basis of the recognition results of the previous first period and the roadway score Sc based on the output of the external environment detection device described above. Content of a related process is expressed, for example, by Eq, (1). In Eq. (1), an argument in parentheses denotes a control time. Control time k is a control time in a current cycle. The argument n is a natural number. RES(k) denotes a recognition result of the current cycle based on the roadway score Sr(k) in the current cycle and a previous recognition result, RES(k−1) denotes a recognition result in a previous cycle, RES(k−2) denotes a recognition result two cycles ago, and RES(k−n) denotes a recognition result n cycles ago. $\alpha$ and $\beta1$ to $\beta n$ are coefficients. For example, $\beta1$ denotes a largest value among $\beta1$ to $\beta n$, $\beta2$ denotes the next largest value, and $\beta n$ is set to the smallest value. $\alpha\cdot Sc(k)+\beta1\cdot RES(k-1)+\beta2\cdot RES(k-2)+\ldots+\beta n\cdot RES(k-n)$ is referred to as an integrated score.

$$RES(k) = f\{\alpha\cdot Sc(k) + \beta1\cdot RES(k-1) + \beta2\cdot RES(k-2) + \ldots + \beta n\cdot RES(k-n)\} \tag{1}$$

Figures 3, 4:
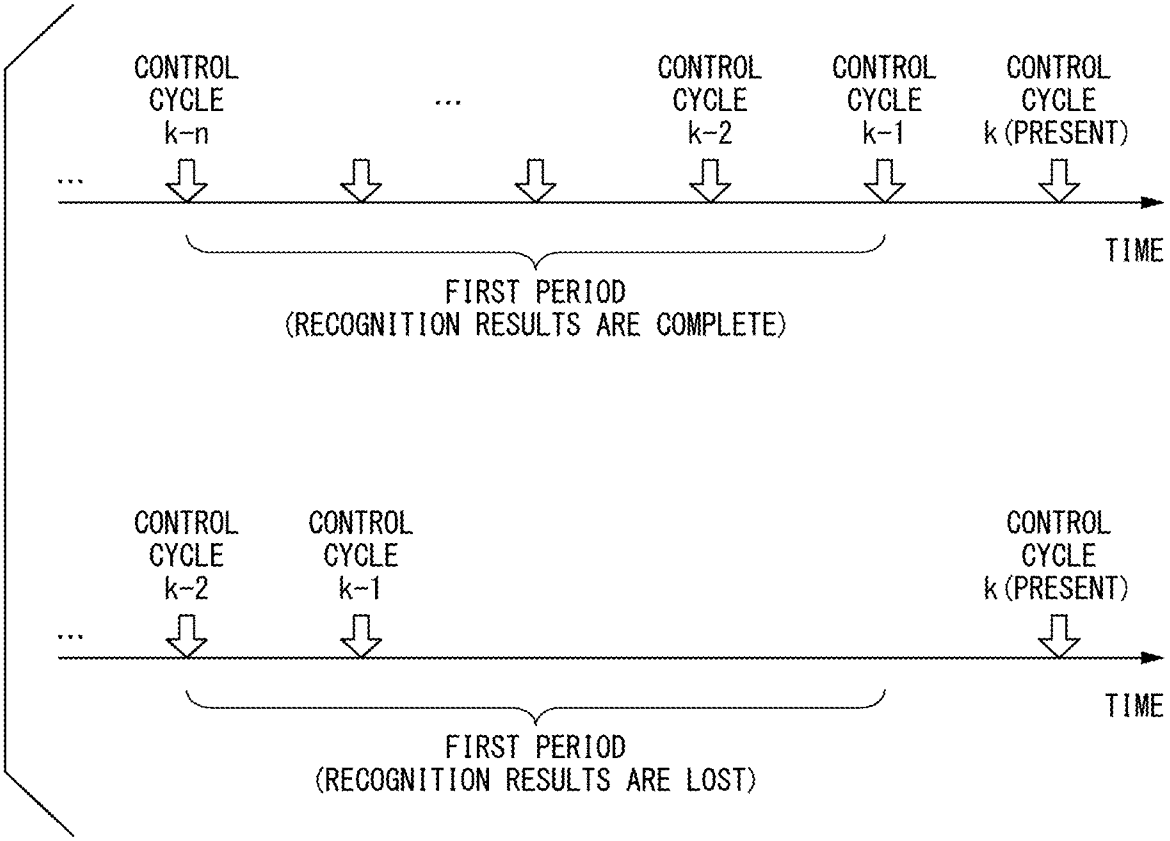
FIG. 3 is a diagram showing an example of content of previous recognition results stored in a storage device.
FIG. 4 is a diagram for comparing a case where recognition results of a previous first period are stored in the storage device with a case where recognition results of the previous first period are not stored in the storage device.

FIG. 3 is a diagram showing an example of content of the previous recognition results stored in the storage device 70. The storage device 70 stores, for example, information indicating the previous recognition results. The information indicating the previous recognition results includes, for example, not only information about a relative control time but also information about an absolute time (the time when the control device 100 starts activation may be zero).

For example, if $\alpha\cdot Sc(k)+\beta1\cdot RES(k-1)+\beta2\cdot RES(k-2)+\ldots+\beta n\cdot RES(k-n)$ is greater than or equal to a threshold value Th, the road type recognition unit 120 determines that the region is a roadway (RES(k)=roadway). For example, a recognition result indicating that the mobile object 1 is moving on the roadway is denoted by 1, a recognition result indicating that the mobile object 1 is moving on the sidewalk is denoted by 0, and these recognition results are used for the next and subsequent recognition processes. In this case, the threshold value Th is set to, for example, a value of about 0.8 to 0.9. The previous first period is not "a period up to a point in time that is relatively earlier by several cycles," but is "a period from the present time to a point in time that is a specified absolute time earlier." In the above-described example, the previous first period is a period of control times k−1 to k−n when it is assumed that the recognition process is iteratively executed without interruption. Also, the present invention is not limited to this and the previous first period may be one point in time in the past. Moreover, a method for reflecting the previous recognition result is not limited to this and any method such as a Kalman filter may be used.

Thus, the road type recognition unit 120 can perform a recognition process in consideration of robust stability by reflecting recognition results of a certain period of time in the past and recognizing whether the mobile object 1 is moving on the roadway or the sidewalk.

Also, the road type recognition unit 120 may collate position information of the mobile object 1 with the map information 72 and recognize whether the mobile object 1 is moving on the roadway or the sidewalk. In this case, the map information needs to be accurate enough to distinguish the sidewalk and the roadway from position coordinates. Moreover, when the "predetermined region" is not only a sidewalk, the road type recognition unit 120 also performs similar processes for roadside strips, bicycle lanes, public open spaces, and the like.

The physical object recognition unit 130 recognizes a physical object located near the mobile object 1 on the basis of an output of the external environment detection device 10. Physical objects include some or all of mobile objects such as a vehicle, a bicycle, and a pedestrian, course boundaries such as a road marking, a step, a guardrail, a road shoulder, a median strip, structures installed on the road such as a road sign and a signboard, and an obstacle such as a falling object located (having fallen) on the course. For example, the physical object recognition unit 130 acquires information such as the presence, position, and type of another mobile object when an image captured by the external camera of the external environment detection device 10 is input to a trained model that has been trained to output information such as the presence, position, and type of a physical object if the image captured by the external camera is input. A type of the other mobile object can also be estimated on the basis of a size in the image and/or the intensity of reflected waves received by the radar device of the external environment detection device 10. Moreover, the physical object recognition unit 130 acquires, for example, the speed of another mobile object detected by the radar device using a Doppler shift or the like.

The control unit 140 controls, for example, the drive device 40 in accordance with a set driving mode. Also, the mobile object 1 may execute only some of the following driving modes, but the control unit 140 sets different speed limit values when the mobile object 1 moves on the roadway and when the mobile object 1 moves on the sidewalk in any case. In this case, the mode changeover switch 22 may be omitted.

In mode A-1, the control unit 140 controls the motor MT of the drive device 40 so that a distance from a physical object located in front of the mobile object 1 is maintained at a certain distance or more when the mobile object 1 moves on the roadway and the mobile object 1 moves at a first speed V1 (e.g., a speed of 10 [km/h] or more and less than several tens of kilometers per hour [km/h]) when a distance from a physical object located in front of the mobile object 1 is sufficiently long with reference to information about a course and a physical object based on the output of the physical object recognition unit 130. The control unit 140 controls the motor MT of the drive device 40 so that a distance from a physical object located in front of the mobile object 1 is maintained at a certain distance or more when the mobile object 1 moves on the sidewalk and the mobile object 1 moves at the second speed V2 (for example, a speed of less than 10 [km/h]) when a distance from a physical object located in front of the mobile object 1 is sufficiently long. This function is similar to an adaptive cruise control (ACC) function of a vehicle in which the first speed V1 or the second speed V2 is designated as the set speed and the technology used in ACC can be used. Moreover, in mode A-1, the control unit 140 controls the steering device SD so that a steering angle of the steered wheel is changed on the basis of a manipulation quantity of the manipulation element 14 such as the steering wheel. This function is similar to that of a power steering device and the technology used in the power steering device can be used. Also, electronic control is not performed in relation to steering and the mobile object 1 may include a steering device in which the manipulation element 14 and the steering mechanism are mechanically connected.

In mode A-2, the control unit 140 controls the steering device SD of the drive device 40 so that a target trajectory along which the mobile object 1 can move while avoiding a physical object within the course is generated with reference to information about the course and the physical object based on the output of the physical object recognition unit 130 and the mobile object 1 moves along the target trajectory. In relation to acceleration/deceleration, the control unit 140 controls the motor MT of the drive device 40 on the basis of the speed of the mobile object 1 and the manipulation quantity of the accelerator pedal or the brake pedal. The control unit 140 controls the motor MT of the drive device 40 in a state in which the first speed V1 is designated as the upper limit speed (wherein this control indicates that the mobile object 1 is not accelerated even if there is a further acceleration instruction when the mobile object 1 reaches the upper limit speed in the case of mode A-2) when the mobile object 1 is moving on the roadway and controls the drive device 40 in a state in which the second speed V2 is designated as the upper limit speed when the mobile object 1 is moving on the sidewalk.

In mode B, the control unit 140 controls the motor MT of the drive device 40 on the basis of the speed of the mobile object 1 and the manipulation quantity of the accelerator pedal or brake pedal. The control unit 140 controls the motor MT of the drive device 40 in a state in which the first speed V1 is designated as the upper limit speed (wherein this control indicates that the mobile object 1 is not accelerated even if there is a further acceleration instruction when the mobile object 1 reaches the upper limit speed in the case of mode B) when the mobile object 1 is moving on the roadway and controls the motor MT of the drive device 40 in a state in which the second speed V2 is designated as the upper limit speed when the mobile object 1 is moving on the sidewalk. In relation to steering, mode B is similar to mode A-1.

In mode C, the control unit 140 controls the drive device 40 so that a target trajectory along which the mobile object 1 can move while avoiding a physical object within the course is generated with reference to information about the course and the physical object based on the output of the physical object recognition unit 130 and the mobile object 1 moves along the target trajectory. Even in mode C, the control unit 140 controls the drive device 40 in a state in which the first speed V1 is designated as the upper limit speed when the mobile object 1 is moving on the roadway and controls the drive device 40 in a state in which the second speed V2 is designated as the upper limit speed when the mobile object 1 is moving on the sidewalk.

[Control when at Least Some Recognition Results of Previous First Period are Lost]

Meanwhile, when the mobile object 1 has been parked and reactivated, when the control device 100 has been reactivated due to some system trouble, when the control device 100 has been reset due to a failure of the external environment detection device 10 or the like, and the like, a situation in which at least some of the recognition results of the previous first period are not stored (or are lost) in the storage device 70 may occur. FIG. 4 is a diagram for comparing a case where recognition results of a previous first period are stored in the storage device 70 with a case where recognition results of the previous first period are not stored in the storage device 70. An upper drawing of FIG. 4 shows the case where the recognition results of the previous first period are stored in the storage device 70 and a lower drawing of FIG. 4 shows the case where the recognition results of the previous first period are not stored in the storage device 70. As shown in FIG. 4, when there is a period during which the recognition process is not continuously performed by the road type recognition unit 120, even if there is a "recognition result of a previous cycle" at the control time, a phenomenon in which the recognition results of the previous first period are lost may occur. The road type recognition unit 120 acquires absolute time information (acquired from an internal clock or through communication) with some means and determines whether or not all recognition results of the previous first period are stored (i.e., are not lost) in the storage device 70.

When all of the recognition results of the previous first period are not stored in the storage device 70, the road type recognition unit 120 outputs a recognition result indicating that the mobile object 1 is moving on the sidewalk during a second period to the control unit 140. The second period may be a variable period or a fixed period. For example, the second period may be a period that ends at a point in time when a sufficiently large value (a value larger than the threshold value Th) is calculated as Sc (k) or a sufficiently small value is calculated as Sc (k) in a state in which the first period is designated as an upper limit.

As described above, it is permissible to move at a higher speed when the mobile object 1 moves on the roadway than when the mobile object 1 moves on the sidewalk. Therefore, the conditions for recognizing that the mobile object 1 is moving on the roadway are preferably set conservatively compared with the conditions for recognizing that the mobile object 1 is moving on the sidewalk in consideration of safety. In this regard, according to the embodiment, when the previous recognition results are not sufficiently provided, the validity of the recognition result can be ensured by outputting the recognition result indicating that the mobile object 1 is moving on the sidewalk. That is, it is possible to appropriately recognize whether the mobile object 1 is moving on the sidewalk or the roadway in consideration of safety.

The road type recognition unit 120 may treat recognition results before the shutdown (recognition results of a time length identical to the first period) as recognition results of the previous first period when the recognition results before the shutdown and the output of the external environment detection device 10 (e.g., a captured image of the external camera) are stored in the storage device 70 and the current output of the external environment detection device 10 (as described above) is similar to the output of the external environment detection device 10 before shutdown in relation to the activation time of the control device 100 in a case where the recognition results of the previous first period are not stored in the storage device 70. In relation to whether or not captured images are similar, for example, the road type recognition unit 120 performs a process of extracting feature points of the captured images and determines that the captured images are similar to each other when positions of feature points match at a predetermined ratio or higher. Moreover, the road type recognition unit 120 may determine that the captured images are similar when a sum of differences between pixel values for pixels of the captured images is less than or equal to a predetermined value. Moreover, the road type recognition unit 120 may perform the above-described process after excluding dynamic physical objects (a vehicle, a pedestrian, a bicycle, and the like) shown in the captured image. It is assumed that the mobile object 1 is parked until the control device 100 is activated after the shutdown. Therefore, the recognition results before the shutdown are more likely to be valid at that time.

When the recognition results of the previous first period are not stored in the storage device 70, the road type recognition unit 120 may output a recognition result indicating that the mobile object 1 is moving on the sidewalk to the control unit 140 during the second period and may cause the control unit 140 to perform a predetermined operation for causing the external environment detection device 10 to detect a feature of either the roadway or the sidewalk. The features are those exemplified as the first or second event described above (steps, braille blocks, road surface markings, and the like). The predetermined operation is an operation for detecting the first event or the second event more accurately and increasing the reliability of the recognition result.

Figure 5:
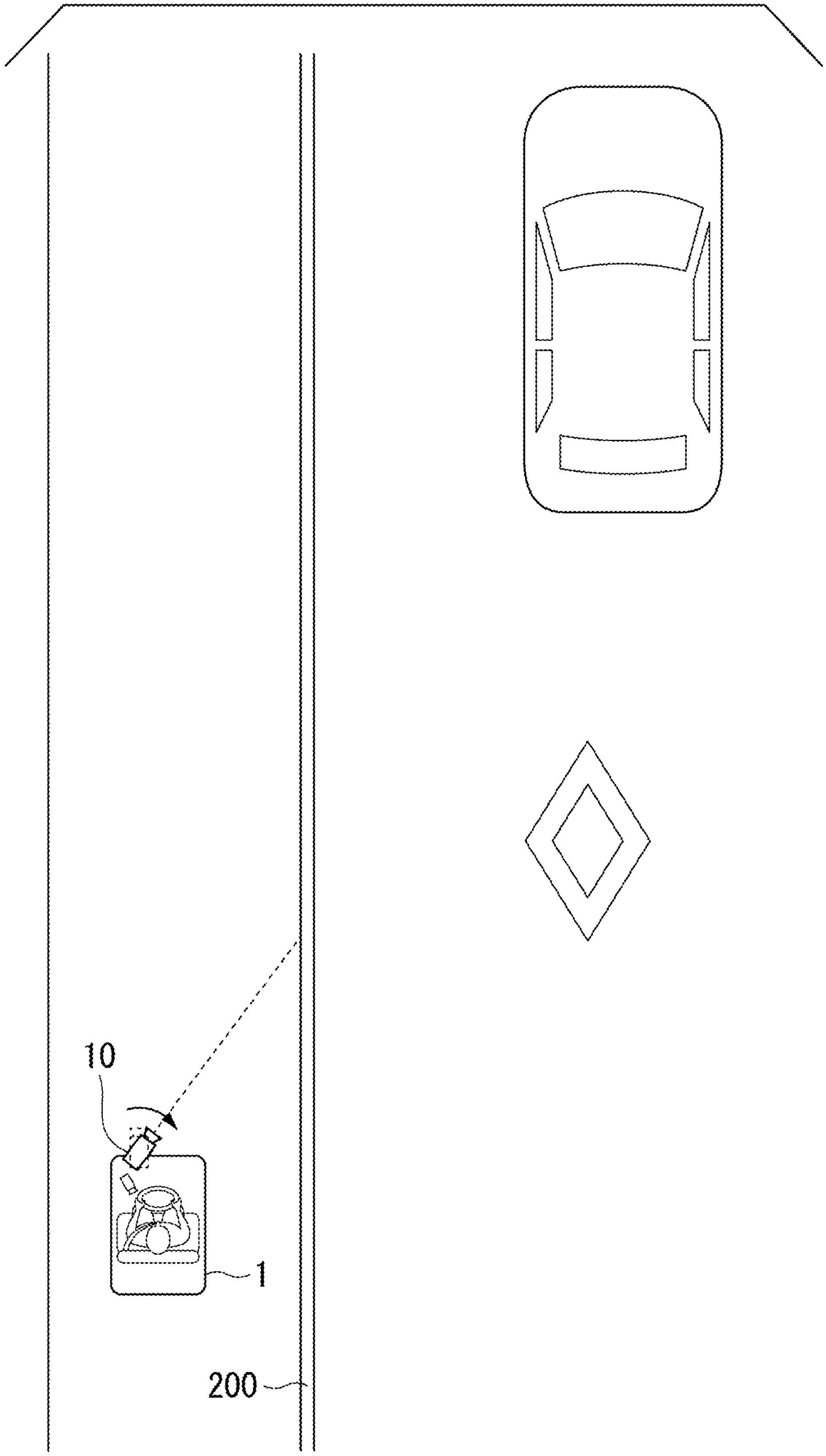
FIG. 5 is a diagram showing a first example of a predetermined operation.

(1) For example, when the external environment detection device 10 can change the detection direction, the predetermined operation may be an operation for causing the external environment detection device 10 to search for a feature while changing the detection direction of the external environment detection device 10. FIG. 5 is a diagram showing a first example of the predetermined operation. As shown in FIG. 5, the predetermined operation may be an operation for searching for the step 200 (an example of a feature) while changing the detection direction of the external environment detection device 10 (the external camera in this case) to a left/right direction and confirming a direction of the step 200 (which is the upper side or the lower side) on the basis of an image obtained by imaging the step 200 at a position closer to the external environment detection device 10.

Figure 6:
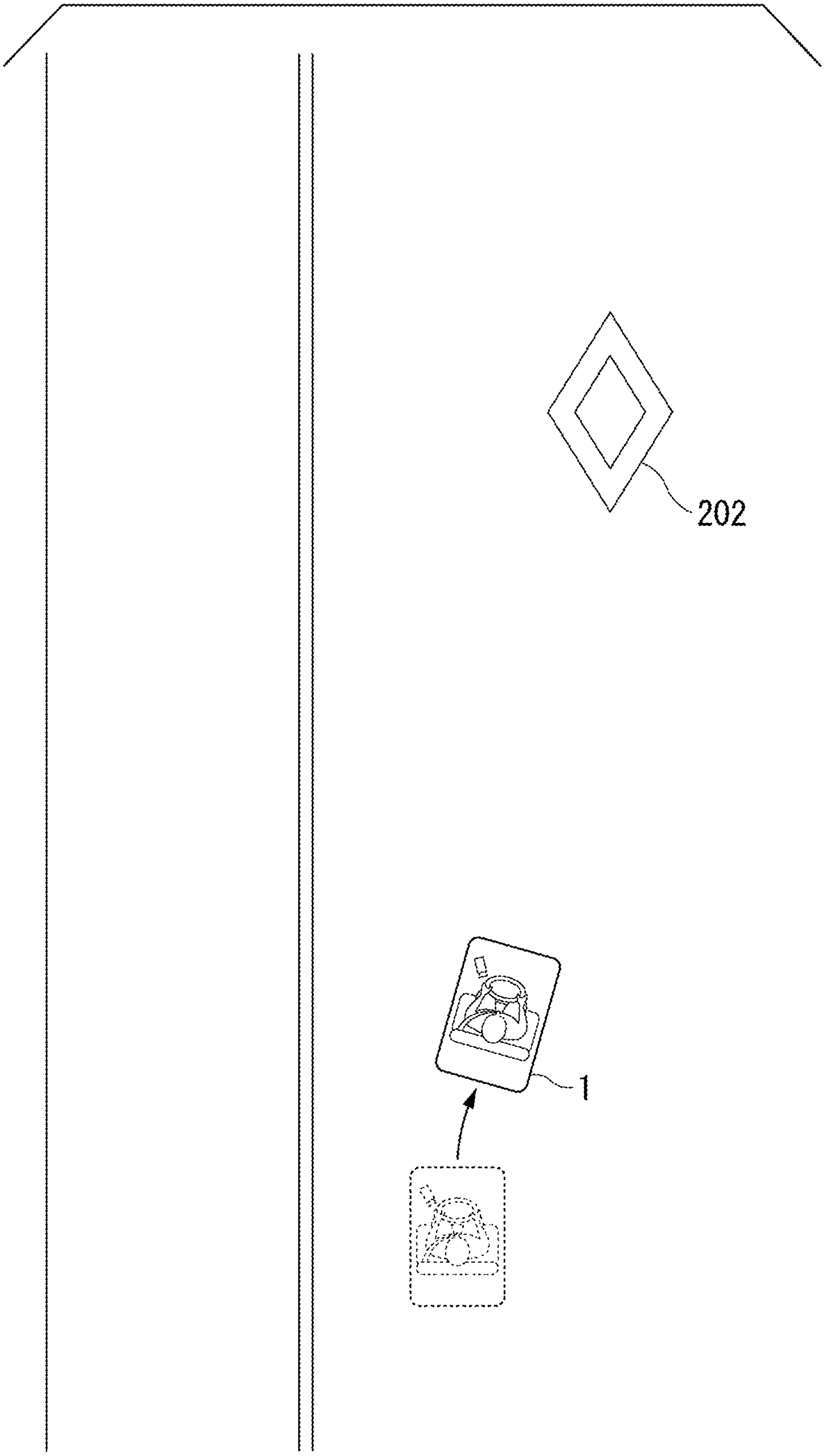
FIG. 6 is a diagram showing a second example of the predetermined operation.

(2) When an operation is being performed in mode C, the predetermined operation may be an operation for causing the external environment detection device 10 to search for a feature by changing the direction of the mobile object 1 within a range of steering performance of the drive device 40, an operation for causing the external environment detection device 10 to recognize a feature more accurately by causing the mobile object 1 to approach the feature, or an operation including both of these operations. FIG. 6 is a diagram showing a second example of the predetermined operation. As shown in FIG. 6, the predetermined operation may be an operation for turning the mobile object 1 so that the road surface marking 202 (a physical object unknown at that time) is in front of the mobile object 1 and further causing the mobile object 1 to approach the road surface marking 202.

Figure 7:
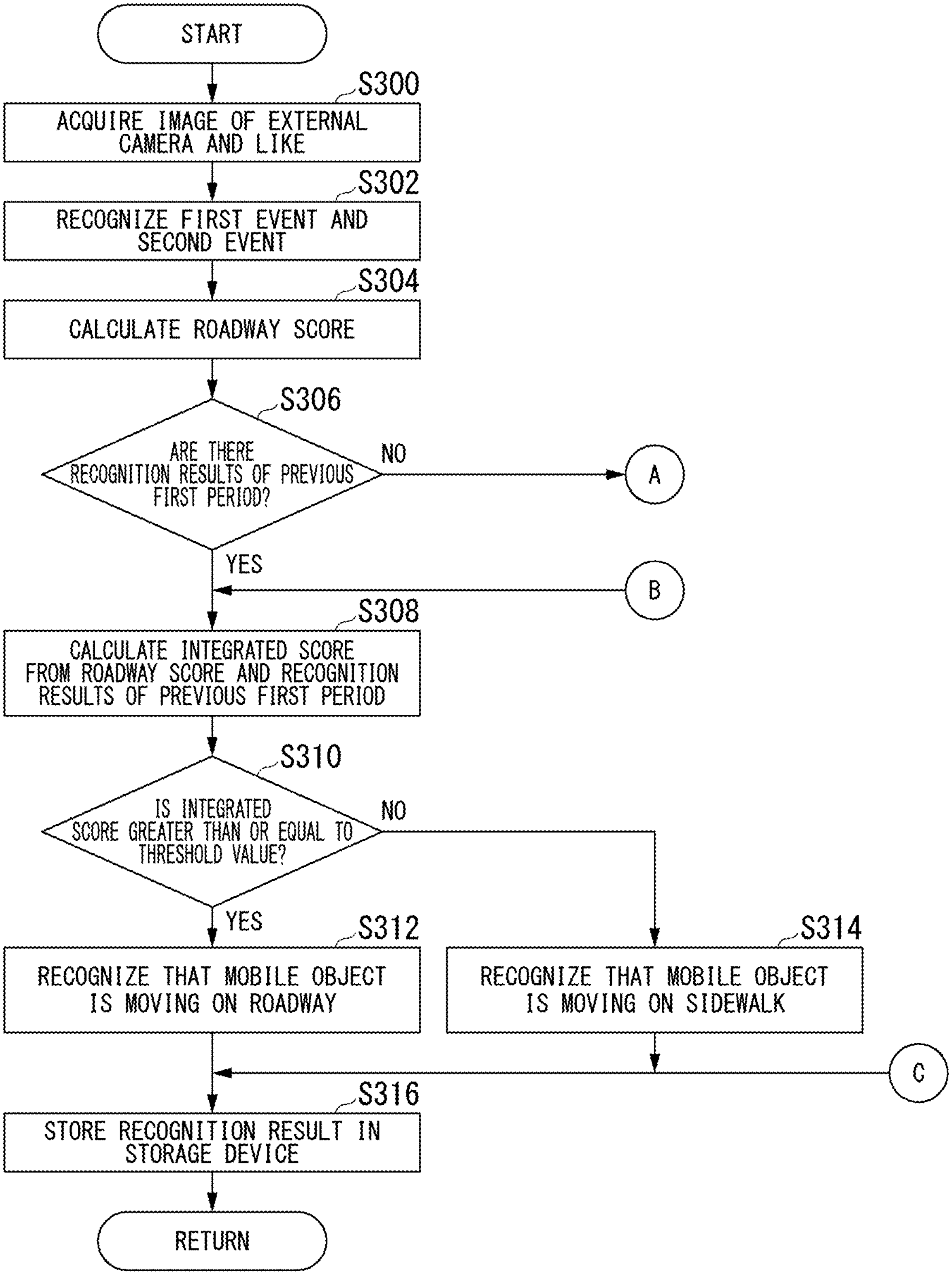
FIG. 7 is a flowchart (Part 1) showing an example of a flow of a process executed by a road type recognition unit of the embodiment.
Figure 8:
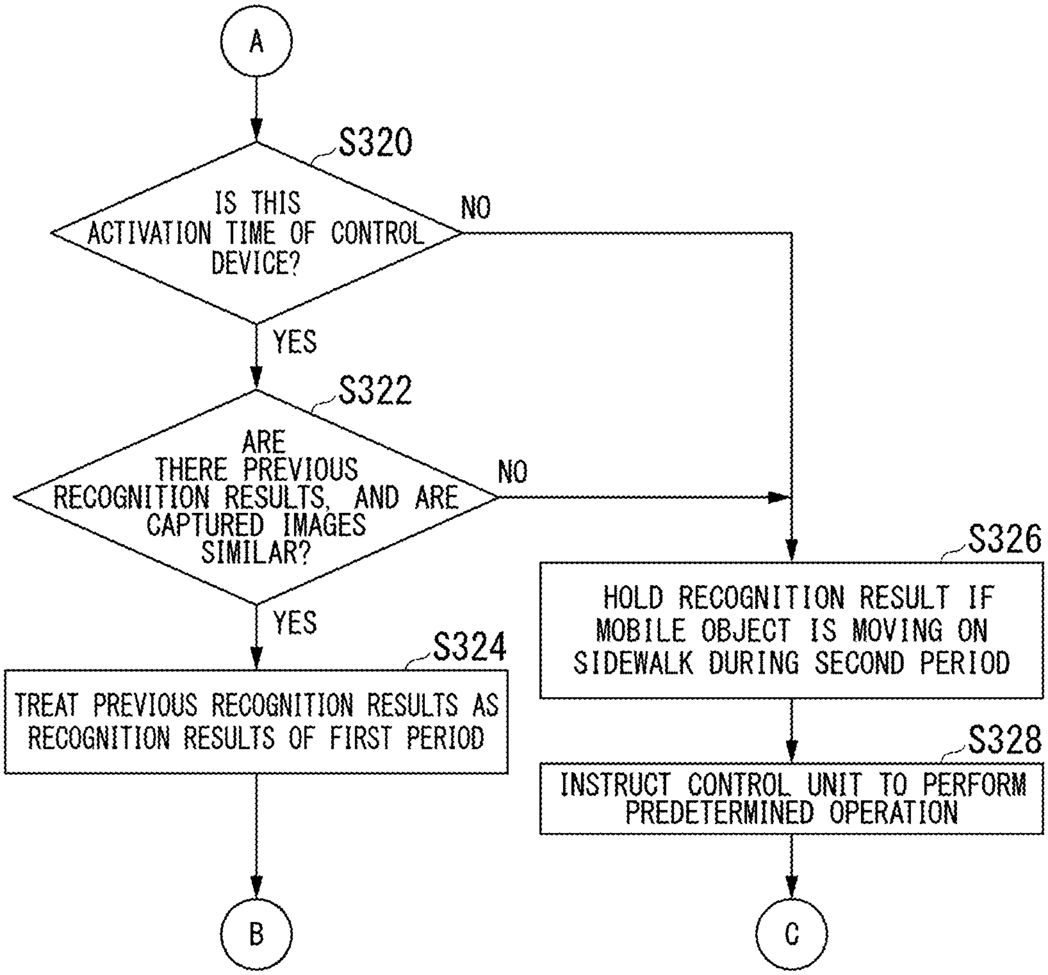
FIG. 8 is a flowchart (Part 2) showing an example of a flow of a process executed by the road type recognition unit of the embodiment.

FIGS. 7 and 8 are a flowchart showing an example of a flow of a process executed by the road type recognition unit 120 of the embodiment. First, the road type recognition unit 120 acquires information for recognition such as an image of the external camera (step S300). Subsequently, the road type recognition unit 120 recognizes first and second events (step S302) and calculates a roadway score Sc (step S304).

Subsequently, the road type recognition unit 120 determines whether or not recognition results of a previous first period are stored in the storage device 70 (step S306). When the recognition results of the previous first period are stored in the storage device 70, the road type recognition unit 120 calculates an integrated score from the roadway score Sc and the recognition results of the previous first period (step S308) and determines whether or not the integrated score is greater than or equal to the threshold value Th (step S310).

When the integrated score is greater than or equal to the threshold value Th, the road type recognition unit 120 recognizes that the mobile object 1 is moving on a roadway (step S312) and causes the storage device 70 to store a recognition result (step S316). When the integrated score is less than the threshold value Th, the road type recognition unit 120 recognizes that the mobile object 1 is moving on a sidewalk (step S314) and causes the storage device 70 to store a recognition result (step S316).

When it is determined that the recognition results of the previous first period are not stored in the storage device 70 in step S306, the road type recognition unit 120 determines whether or not the present time is an activation time of the control device 100 (step S320) (see FIG. 8). When it is determined that the present time is an activation time of the control device 100, the road type recognition unit 120 determines whether or not the previous recognition results are stored in the storage device 70 and captured images are similar as described above (step S322). When the previous recognition results are stored in the storage device 70 and the captured images are similar, the road type recognition unit 120 treats the previous recognition results (not corresponding to the first period) as the recognition results of the previous first period (step S324) and moves the process to step S308.

When a negative determination result has been obtained in step S320 or S322, the road type recognition unit 120 continuously recognizes that the mobile object 1 is moving on the sidewalk during a second period (or holds the recognition result) (step S326) and instructs the control unit 140 to perform a predetermined operation (step S328). Subsequently, the process moves to step S316, but the recognition result stored in the storage device 70 may be a recognition result other than the held recognition result when the process moves from step S328 to step S316. For example, the road type recognition unit 120 may cause the storage device 70 to store a provisional recognition result as a recognition result mainly on the basis of the roadway score Sc.

According to the above-described embodiment, the road type recognition unit 120 can designate a process of recognizing whether the mobile object 1 is moving on the roadway or in a predetermined region (on the sidewalk) on the basis of the output of the external environment detection device 10 that detects an external situation of the mobile object 1 as a basic process, iteratively recognize whether the mobile object 1 is moving on the roadway or in the predetermined region on the basis of the previous recognition results of the first period and the output of the external environment detection device 10, cause the storage device 70 to store the recognition result, and appropriately recognize whether the mobile object 1 is moving on the roadway or in the predetermined region different from the roadway in consideration of robust stability so that a recognition result indicating that the mobile object 1 is moving on the sidewalk is output to the control unit 140 during the second period when the recognition results of the previous first period are not stored in the storage device 70.

The embodiment described above can be represented as follows.

A mobile object control device including:

a storage medium storing computer-readable instructions; and a processor connected to the storage medium, the processor executing the computer-readable instructions to:

recognize whether a mobile object capable of moving both on a roadway and in a predetermined region different from the roadway is moving on the roadway or in the predetermined region on the basis of an output of an external environment detection device configured to detect an external situation of the mobile object; and limit a speed of a case where the mobile object moves on the roadway to a first speed and limit a speed of a case where the mobile object moves in the predetermined region to a second speed lower than the first speed, wherein the recognizing includes iteratively recognizing whether the mobile object is moving on the roadway or in the predetermined region on the basis of recognition results of a previous first period and the output of the external environment detection device and causing a storage device to store a recognition result, and outputting a recognition result indicating that the mobile object is moving during a second period to the control unit when at least some of the recognition results of the previous first period in the storage device are lost.

Although modes for carrying out the present invention have been described above using embodiments, the present invention is not limited to the embodiments and various modifications and substitutions can also be made without departing from the scope and spirit of the present invention.

REFERENCE SIGNS LIST

10 External environment detection device
12 Mobile object sensor
14 Manipulation element
16 Internal camera
18 Positioning device
22 Mode changeover switch
30 Moving mechanism
40 Drive device
50 External notification device
70 Storage device
100 Control device
120 Road type recognition unit
130 Physical object recognition unit
140 Control unit

The invention claimed is:

1. A mobile object control device for controlling a mobile object capable of moving both on a roadway and in a predetermined region different from the roadway, the mobile object control device comprising: a processor configured to:

recognize whether the mobile object is moving on the roadway or in the predetermined region on the basis of an output of an external environment detection device configured to detect an external situation of the mobile object;

limit a speed of a case where the mobile object moves on the roadway to a first speed and limit a speed of a case where the mobile object moves in the predetermined region to a second speed lower than the first speed;

iteratively recognize whether the mobile object is moving on the roadway or in the predetermined region on the basis of recognition results of a previous first period and the output of the external environment detection device;

cause a storage device to store a recognition result, and output a recognition result indicating that the mobile object is moving on a sidewalk during a second period when at least some of the recognition results of the previous first period in the storage device are lost.

2. The mobile object control device according to claim 1, wherein the processor is further configured to perform a predetermined operation for causing the external environment detection device to detect a feature of either the roadway or the predetermined region when at least some of the recognition results of the previous first period in the storage device are lost.

3. The mobile object control device according to claim 2, wherein the external environment detection device is able to change a detection direction, and wherein the predetermined operation is an operation for causing the external environment detection device to search for the feature by changing the detection direction of the external environment detection device.

4. The mobile object control device according to claim 2, wherein the processor is further configured to cause the mobile object to move autonomously by controlling a drive device, and wherein the predetermined operation is an operation for causing the external environment detection device to search for the feature while changing a direction of the mobile object.

5. The mobile object control device according to claim 2, wherein the processor is further configured to cause the mobile object to move autonomously by controlling a drive device, and wherein the predetermined operation is an operation for causing the mobile object to approach the feature and causing the external environment detection device to accurately recognize the feature.

6. The mobile object control device according to claim 1, wherein, when the mobile object control device is activated, the processor is further configured to treat a recognition result before a shutdown as a recognition result of the previous first period if a recognition result before the shutdown and the output of the external environment detection device are stored in the storage device and a current output of the external environment detection device is similar to an output of the external environment detection device before the shutdown.

7. The mobile object control device according to claim 6, wherein the external environment detection device is an external camera configured to image the outside of the mobile object, and wherein the processor is further configured to perform a process of extracting a feature point of an image captured by the external camera and determine that the current output of the external environment detection device is similar to the output of the external environment detection device before the shutdown when positions of feature points match at a predetermined ratio or higher.

8. A mobile object control method comprising:

recognizing, by a computer for controlling a mobile object capable of moving both on a roadway and in a predetermined region different from the roadway, whether the mobile object is moving on the roadway or in the predetermined region on the basis of an output of an external environment detection device configured to detect an external situation of the mobile object; and limiting, by the computer, a speed of a case where the mobile object moves on the roadway to a first speed and limiting a speed of a case where the mobile object moves in the predetermined region to a second speed lower than the first speed, wherein the recognizing includes iteratively recognizing whether the mobile object is moving on the roadway or in the predetermined region on the basis of recognition results of a previous first period and the output of the external environment detection device and causing a storage device to store a recognition result, and outputting a recognition result indicating that the mobile object is moving on a side walk during a second period when at least some of the recognition results of the previous first period in the storage device are lost.

9. A non-transitory storage medium storing a program for causing a computer for controlling a mobile object capable of moving both on a roadway and in a predetermined region different from the roadway to:

recognize whether the mobile object is moving on the roadway or in the predetermined region on the basis of an output of an external environment detection device configured to detect an external situation of the mobile object; and limit a speed of a case where the mobile object moves on the roadway to a first speed and limit a speed of a case where the mobile object moves in the predetermined region to a second speed lower than the first speed, wherein the recognizing includes iteratively recognizing whether the mobile object is moving on the roadway or in the predetermined region on the basis of recognition results of a previous first period and the output of the external environment detection device and causing a storage device to store a recognition result, and outputting a recognition result indicating that the mobile object is moving on a side walk during a second period when at least some of the recognition results of the previous first period in the storage device are lost.

* * * * *